US012591391B2

(12) United States Patent (10) Patent No.: US 12,591,391 B2

Clarke (45) Date of Patent: Mar. 31, 2026

(54) EQUALIZATION OF WRITE QUEUE DEPTHS

(71) Applicant: Kioxia Corporation, Tokyo (JP)

(72) Inventor: Brian Clarke, Berks (GB)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/374,192

(22) Filed: Sep. 28, 2023

(65) Prior Publication Data

US 2025/0110665 A1 Apr. 3, 2025

(51) Int. Cl.
G06F 3/06 (2006.01)

(52) U.S. Cl.
CPC .......... G06F 3/0659 (2013.01); G06F 3/0604 (2013.01); G06F 3/064 (2013.01); G06F 3/0679 (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20;

(Continued)

(56) References Cited

U.S. PATENT DOCUMENTS 7,792,882 B2 * 9/2010 Moore .................. G06F 3/0631
707/822
8,438,334 B2 * 5/2013 Bell, Jr. ................ G06F 16/122
711/160

(Continued)

OTHER PUBLICATIONS

Introducing Software-Enabled Flash™ (SEF) Technology; KIOXIA; Apr. 2020; retrieved from https://softwareenabledflash.org/wp-content/uploads/sites/4/2022/03/PDF_2-Introducing_SEF_Technology_White_Paper.pdf on Oct. 28, 2024 (Year: 2020).*

(Continued)

*Primary Examiner* — Daniel C. Chappell

(74) *Attorney, Agent, or Firm* — Foley & Lardner LLP

(57) ABSTRACT

A method for writing data to an SSD configured to store data in a plurality of memory dies each comprising a plurality of memory blocks. The plurality of memory blocks are logically organized as a plurality of superblocks. The method is performed by a controller in communication with the plurality of memory dies. The method comprises generating, from accumulated write data, a plurality of commands. The method also comprises assigning, to each of the plurality of generated commands, an identifier corresponding to a superblock of the plurality of superblocks associated with the command. The method further comprises tracking a number of commands in each of a plurality of command queues corresponding to the dies of the superblock. The method additionally comprises queuing at least one of the plurality of generated commands to a die of the superblock having a corresponding command queue containing the smallest number of commands.

20 Claims, 12 Drawing Sheets

(58) Field of Classification Search

CPC ........ G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 8,996,450 | B1 * | 3/2015 | Rubio ................... | G06F 3/0631 |
| | | | | 707/602 |
| 10,895,989 | B2 * | 1/2021 | Ikeda ...................... | G06F 3/067 |
| 11,307,806 | B2 * | 4/2022 | Tanakamaru ......... | G06F 3/0629 |
| 11,853,203 | B1 * | 12/2023 | Muthya Narahari ........................ | |
| | | | | G06F 12/0246 |
| 2009/0044190 | A1 * | 2/2009 | Tringali .............. | G06F 13/1689 |
| | | | | 718/102 |
| 2012/0163178 | A1 * | 6/2012 | Gordon ................... | H04L 47/24 |
| | | | | 370/237 |
| 2012/0192196 | A1 * | 7/2012 | Yasuda .................. | G06Q 10/10 |
| | | | | 718/103 |
| 2016/0299697 | A1 * | 10/2016 | Chen ..................... | G06F 3/0611 |
| 2017/0300263 | A1 * | 10/2017 | Helmick ............... | G06F 3/0679 |
| 2018/0217951 | A1 * | 8/2018 | Benisty .............. | G06F 13/1642 |
| 2018/0285294 | A1 * | 10/2018 | Chagam Reddy .. | H04L 47/6215 |
| 2020/0004430 | A1 * | 1/2020 | Navon .................. | G06F 3/0679 |
| 2020/0174673 | A1 * | 6/2020 | Ikeda .................... | G06F 3/0611 |
| 2020/0409597 | A1 * | 12/2020 | Ganesh ................. | G06F 3/0659 |
| 2021/0081115 | A1 * | 3/2021 | Clarke ................. | G06F 3/0659 |
| 2021/0081135 | A1 * | 3/2021 | Troy ..................... | G06F 3/0679 |
| 2022/0261183 | A1 * | 8/2022 | Horspool ............... | G06F 3/061 |

OTHER PUBLICATIONS

De-indirection for Flash-based SSDs with Nameless Writes; Yiying Zhang et al.; Feb. 7, 2012; retrieved from https://www.usenix.org/system/files/conference/fast12/zhang2-7-12.pdf on Oct. 28, 2024 (Year: 2012).*

A. Tavakkol et al., "FLIN: Enabling Fairness and Enhancing Performance in Modern NVMe Solid State Drives," 2018 ACM/IEEE 45th Annual International Symposium on Computer Architecture (ISCA), Los Angeles, CA, USA, 2018, pp. 397-410, doi: 10.1109/ISCA.2018.00041. (Year: 2018).*

L. Zuolo, C. Zambelli, R. Micheloni and P. Olivo, "Solid-State Drives: Memory Driven Design Methodologies for Optimal Performance," in Proceedings of the IEEE, vol. 105, No. 9, pp. 1589-1608, Sep. 2017, doi: 10.1109/JPROC.2017.2733621. (Year: 2017).*

Performance analysis of load balancing policies with memory; Hellemans et al.; Nov. 18, 2021; retrieved from https://www.sciencedirect.com/science/article/pii/S0166531621000766?via%3Dihub (Year: 2021).*

SSD Queue Depth; Paul Genua; Feb. 7, 2018; retrieved from https://www.linkedin.com/pulse/ssd-queue-depth-paul-genua/ (Year: 2018).*

* cited by examiner

FIG. 2B

EQUALIZATION OF WRITE QUEUE DEPTHS

FIELD

The present disclosure relates to solid-state drives (SSD) and methods for equalizing the write queue depths of NAND program queues that receive commands from multiple write streams.

BACKGROUND

A solid-state drive (SSD) generally has faster performance, is more compact, and is less sensitive to vibration or physical shock than a magnetic disk drive. SSDs utilize physical memory cells that comprise non-volatile semiconductor storage devices, such as NAND memory devices, to store data. Writing data to and reading data from the physical memory cells of an SSD typically involves transferring data between a host external to the SSD and the non-volatile semiconductor storage devices. A controller of an SSD manages this transfer of data between a host and the memory cells of the SSD.

A host in communication with the SSD may be running several applications. Each application running in the host can send program commands to the SSD via its own write stream. An SSD receiving program commands from a given write stream will accumulate commands for the stream in internal memory prior to the commands being sent to the NAND devices. Once a sufficient number of commands from a program have been received, the controller queues the commands to the memory dies. The controller may divide the memory dies of the NAND devices into superblocks, and may queue the commands to a die corresponding to a particular superblock. Each superblock may comprise a plurality of stripes, and the controller may completely program a given stripe of a superblock before it begins to program another stripe of the superblock.

In such systems, the decision of the die to which each program command will be directed is made once a sufficient number of commands for programming have been received by the controller. This, however, leads to difficulties in the presence of multiple write streams. In particular, each write stream may be directed to a different superblock, as directing different streams to different superblocks diminishes write amplification and improves the efficiency of garbage collection. However, such streams may still attempt to access the same memory dies simultaneously. In the presence of insufficient amounts of internal memory, this may lead to collisions between streams. This results in imbalances in die queue depths due to the lack of coordination of die picking between the multiple write streams, and may lead to die starvation. This reduces overall system efficiency and throughput.

SUMMARY

According to an embodiment of the present disclosure, there is provided a method for equalizing NAND queue depths in the presence of multiple write streams. The method is performed by a controller of an SSD, the controller communicatively coupled to each of a plurality of non-volatile memory (NVM) dies and configured to logically divide the plurality of NVM dies into a plurality of superblocks. The method comprises generating, from a plurality of accumulated write data, a plurality of commands. The method then assigns, to each of the plurality of generated commands, an identifier corresponding to a superblock of the plurality of superblocks associated with the command. Next, the method tracks a number of commands in each of a plurality of command queues corresponding to the dies of the superblock. The method then queues at least one of the plurality of accumulated commands to a die of the superblock having a corresponding command queue containing the smallest number of commands.

According to a further embodiment of the present disclosure, there is provided a solid-state drive (SSD) comprising a plurality of non-volatile memory dies. The SSD also comprises a controller communicatively coupled to each of the plurality of non-volatile memory dies. The controller is configured to logically divide the plurality of NVM dies into a plurality of superblocks. The controller is further configured to generate, from a plurality of accumulated write data, a plurality of commands. Additionally, the controller is configured to assign, to each of the plurality of generated commands, an identifier corresponding to a superblock of the plurality of superblocks associated with the command. The controller is also configured to track a number of commands in each of a plurality of command queues corresponding to the dies of the superblock. The controller is configured to queue at least one of the plurality of generated commands to a die of the superblock having a corresponding command queue containing the smallest number of commands. According to the above embodiments, command queue depths are equalized so as to avoid die starvation and improve SSD throughput and performance.

In some implementations, when each of the plurality of command queues corresponding to the respective superblock contains the same number of commands, the method further comprises queueing the at least one of the plurality of generated commands to a die of the superblock corresponding to a description of the at least one of the plurality of generated commands generated by the controller. In certain implementations, the method further comprises maintaining a register of the dies of each of the plurality of superblocks that have been programmed. In further implementations, the method further comprises updating the register based on the die to which each of the plurality of received commands is queued.

In some implementations, the plurality of accumulated write data are received from a write stream of a plurality of write streams, each of the plurality of write streams corresponding to a respective program and to a respective superblock of the plurality of superblocks. In certain implementations, each of the plurality of generated commands associated with a respective write stream of the plurality of write streams is queued once all of the commands for the respective write stream have been generated. In further implementations, the superblock identifier corresponds to a stream identifier associated with each of the plurality of write data received from the write stream.

In some implementations, the steps of generating, assigning, maintaining, and updating are performed by a flash-translation-layer (FTL) of the controller. In certain implementations, the step of tracking is performed by a flash-interface-layer (FIL) of the controller.

In some implementations, the method further comprises querying, by the FIL, the FTL to determine the NVM dies corresponding to the superblock that have yet to be programmed, and queuing, based on a result of the querying, the at least one of the plurality of generated commands to the die of the superblock.

In some implementations, the controller of the SSD is further configured to, when each of the plurality of command queues corresponding to the respective superblock contains the same number of commands, queue the at least one of the plurality of received commands to a die of the superblock corresponding to a description of the at least one of the plurality of generated commands generated by the controller. In certain implementations, the controller of the SSD is further configured to maintain a register of the dies of each of the plurality of superblocks that have been programmed. In further implementations, the controller of the SSD is further configured to update the register for the superblock based on the die to which each of the plurality of generated commands is queued.

In some implementations, the controller of the SSD is further configured to receive the plurality of accumulated write data from at least one of a plurality of write streams, each of the plurality of write streams corresponding to a respective program. In certain implementations, the controller of the SSD is further configured to queue each of the plurality of generated commands associated with a respective write stream once all of the commands for the respective write stream program have been generated. In further implementations, the superblock identifier corresponds to a stream identifier associated with each of the plurality of write data received from the write stream.

In some implementations, the controller of the SSD is configured to generate, assign, maintain, and update by a flash-translation-layer (FTL) of the controller. In certain implementations, the controller of the SSD is configured to track the number of commands in each of the plurality of command queues corresponding to the dies of the superblock by a flash-interface-layer (FIL) of the controller. In further implementations, the FIL of the controller is configured to query the FTL to determine the NVM dies corresponding to the superblock that have yet to be programmed, and queue, based on a result of the querying, the at least one of the plurality of generated commands to the die of the superblock.

BRIEF DESCRIPTION OF DRAWINGS

The foregoing and other objects and advantages will be apparent upon consideration of the following detailed description, taken in conjunction with the accompanying drawings, in which like reference characters refer to like parts throughout, and in which:

FIG. 2B illustrates an exemplary manner in which the SSD of FIG. 2A receives commands from a single host write stream;

DETAILED DESCRIPTION

To provide an overall understanding of the devices described herein, certain illustrative embodiments will be described. Although the embodiments and features described herein are specifically described for use in connection with an SSD having a controller, it will be understood that all the components and other features outlined below may be combined with one another in any suitable manner and may be adapted and applied to other types of SSD architectures with memories having a similar need to equalize queue depths in the presence of multiple write streams.

Figure 1:
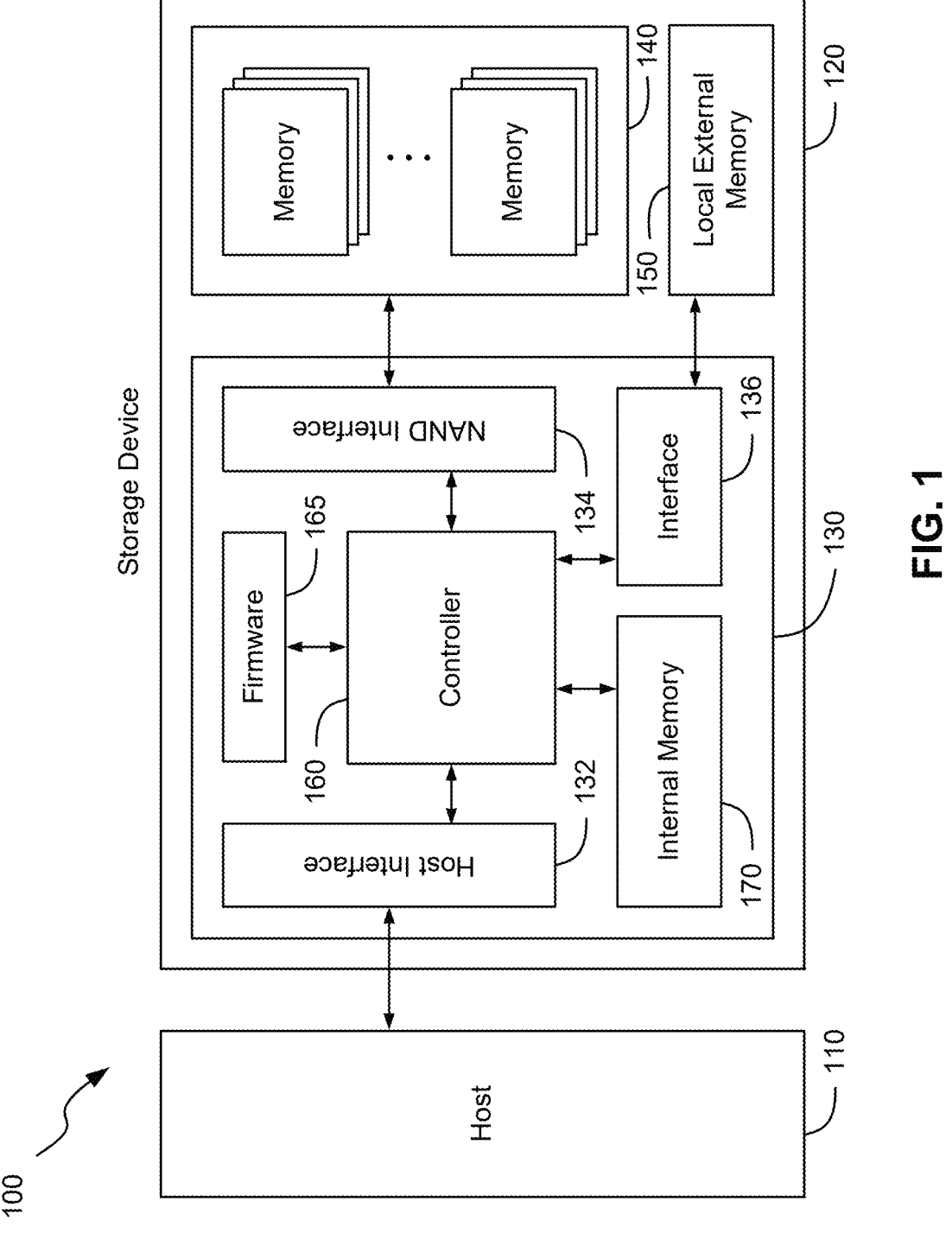
FIG. 1 illustrates a block diagram of an SSD, configured according to one or more embodiments of the present disclosure.

FIG. 1 is a block diagram of a memory system 100 comprising at least one host 110 in communication with a storage device 120, which may be a solid-state drive (SSD). The host 110 can be a computing system that comprises processors, memories, and other components as is generally known in the art, and which are not shown in FIG. 1 for the sake of brevity. As described herein, host 110 sends write data to storage device 120. Storage device 120 may include an integrated circuit 130. Such an integrated circuit 130 may comprise a system-on-chip (SoC) 130, SoCs being advantageous as they provide a single integrated circuit that contains circuitry and components of the electronic system for the storage device 120 to function.

Storage device 120 provides non-volatile storage functionality for use by the host 110. SoC 130 comprises a controller 160 communicatively coupled to a memory 140 such as an SSD. In the case of memory 140 comprising an SSD, the memory 140 may additionally comprise a NAND semiconductor memory, such as a NAND-based flash memory device. Each such NAND-based flash memory device contains a plurality of memory dies, each of which is logically divided into a plurality of planes. Each plane contains a plurality of blocks, each of which is assigned an identifier that is unique within the plane, but that is common to comparable blocks across the plurality of planes of the die, and across the plurality of dies. The blocks are further divided into a plurality of pages, each of which is numbered in sequence within a given block. NAND pages are the smallest unit at which data can be read from and written to a NAND device.

The controller 160 is configured to logically divide the blocks of memory 140 having the same identifier across multiple planes, and across multiple chips, together into a superblock. Each die in the superblock contributes a block to the superblock, and as described further below, each superblock may be logically divided into a plurality of stripes. As discussed below with respect to FIG. 2, a flash-translation-layer (FTL) of controller 160 may be responsible for logically dividing the memory cells into superblocks.

Storage device 120 may include a local memory 150 external to the SoC 130, such as a dynamic random-access memory ("DRAM"). Local external memory 150 comprises several buffers used to buffer data during read and write operations between the host 110 and the memory 140. As described further below, local memory 150 may also contain a lookup table that maps a logical block address (LBA) of each command to the physical location on the memory 140 where the command is executed.

Storage device 120 may also include a memory 170 internal to the SoC 130, such as a static random-access memory ("SRAM") that forms part of the same integrated circuit as the SoC 130. Internal memory 170 may comprise several buffers used to buffer data during read and write operations between the host 110 and the memory 140, and may thus be used in conjunction with, or instead of, local external memory 150 to buffer data during such operations.

Storage device 120 may comprise a host interface 132 which enables communication with the host 110 for the receipt of input/output (I/O) commands and Vendor Unique Commands (VUCs). Storage device 120 may also include a NAND interface 134 for communication with the memory 140 (through a plurality of channels, not shown), and an interface 136 for communication with the local external memory 150. Interface 132 on the SoC 130 may comprise a Serial Advanced Technology Attachment (SATA) connector or a NVMe™ connector (NVMe™ is an acronym for "NVM express," where "NVM" stands for "nonvolatile memory") operating with a PCIe™ ("Peripheral Component Interface Express") bus, for example. Interface 134 may comprise an Open NAND Flash Interface (ONFI) or a manufacturer's proprietary interface, for example. Interface 134 may also be referred to as a flash-interface-layer (FIL). Interface 136 may comprise, for example, an interface according to, but not limited to: a Double Data Rate (DDR) memory bus standard such as DDR3, DDR4 or DDR5; a Low Power Double Data rate (LPDDR) memory bus standard such as LPDDR3, LPDDR4 or LPDDR5; a Hybrid Memory Cube (HMC) memory bus standard.

The controller 160 enables the storage device 120 to perform various functions such as processing VUC commands received from the host 110 as well as internal commands generated within the storage device 120 to maintain functionality (e.g. NVMe™ commands such as 'FormatNVM'). The storage device 120 also includes a Read-Only Memory (ROM), not shown, that stores firmware 165 for the operation of various states of the storage device 120. The firmware 165 comprises computer executable instructions that are executed by the controller 160 for operation of the storage device 120. The ROM is programmed with the firmware 165 during manufacture of the storage device 120 and may be re-programmed by the controller 160 as necessary. This allows the operation of the storage device 120 to be adapted as needed.

The controller 160 may also comprise an error correction encoder and decoder (not shown). The decoder may comprise an Encryption and Error Correction Code (ECC) decoder communicatively coupled to a hard-decision decoder and a soft-decision decoder. The ECC decoder may also include a BCH error corrector or any other cyclic error corrector. Data written to the memory 140 is encoded with an ECC code in a first instance to give ECC-encoded data. To decode data from the memory, data from a target row of memory cells is passed through the hard-decision decoder, and, if required, the soft-decision decoder. Additionally, wear and tear of the device during its lifespan result in errors being introduced to the data when the data is read out from the memory device.

Figure 2A:
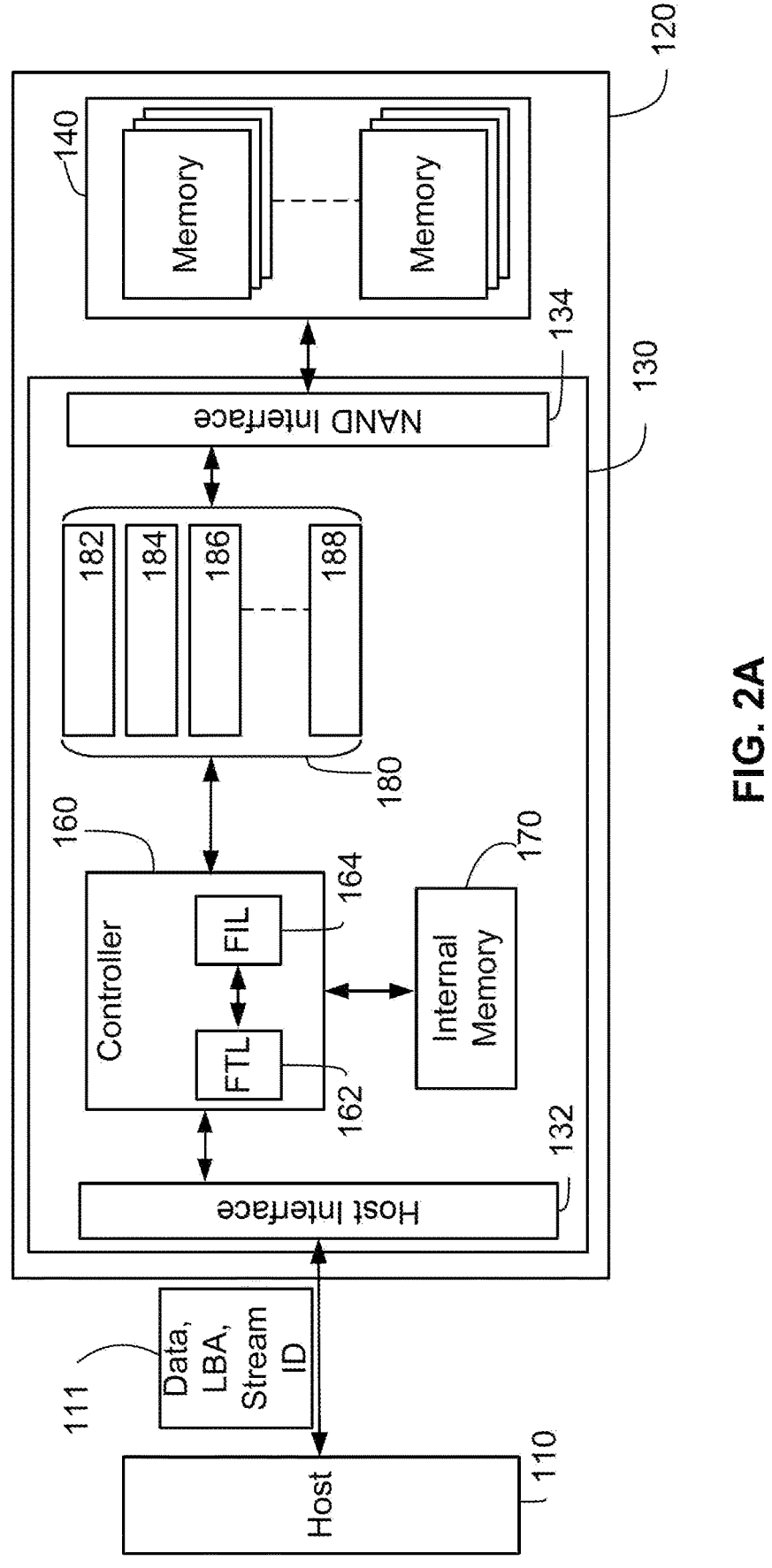
FIG. 2A illustrates a simplified block diagram of the SSD of FIG. 1.

FIG. 2A shows a simplified block diagram of SSD 120 of FIG. 1 in accordance with embodiments of the present disclosure. For the sake of clarity, certain components of SSD 120 of FIG. 1, including local external memory 150, firmware 165, and interface 136 are not illustrated in FIG. 2A. SSD 120 comprises an SOC 130 in communication with host 110 via host interface 132. Host interface 132 is configured to receive write data from host 110. Host interface 132 is communicatively coupled to controller 160, and is configured to pass received write data to internal memory 170 via controller 160. As discussed below, controller 160 may comprise a flash-translation-layer (FTL) 162 and a flash-interface-layer (FIL) 164 that together may generate program commands from the received write data and direct these commands from controller 160 to NAND memory. In some implementations, FTL 162 controls data placement to memory 140. As previously discussed, the NVM dies are divided logically into a plurality of superblocks by controller 160. FTL 162 of controller 160 may further be responsible for logically dividing the plurality of NVM dies into the plurality of superblocks.

Each write datum 111 received by the host interface 132 is associated with a corresponding logical block address (LBA). Host 110 may send write data via multiple program streams (also called write streams, host streams, command streams, or streams) to storage device host interface 132. Each stream sent from the host 110 may correspond to a respective program running on the host. Each write datum sent from the host 110 may contain a stream identifier that designates the stream from which the write datum was sent, and thus the respective program to which a write datum sent by host 110 corresponds. As described below, controller 160 will analyze the stream identifier received with each write datum and will subsequently direct commands generated from write data corresponding to the same identifier to the same superblock.

Host interface 132 sends received write data, including their corresponding LBAs and stream identifiers, to controller 160. Once the host interface 132 sends write data received from host 110 to controller 160, the controller 160 accumulates the write data in internal memory 170 prior to execution of the commands generated from the write data in memory 140. In some instances, controller 160 may accumulate the write data in local external memory 150.

The controller 160 will generate program commands from write data received from host 110 when data for programming to three or four pages of a given memory die of memory 140 have been accumulated in internal memory 170. This programming sequence is called a Full Sequence Program (FSP). In the presence of multiple program streams, the data for each stream are accumulated into separate FSPs. In some implementations, controller 160 begins queueing commands to memory 140 once all of the write data for a given program has been received from host 110, i.e., once all FSPs for the given program have been filled.

In the event that there are bad blocks encompassed within a given FSP for a die, it may be necessary to reduce the amount of data that is accumulated from the internal memory 170 for the FSP. As discussed above, controller 160 logically divides the memory dies into a plurality of superblocks, and each superblock comprises a plurality of stripes. Each stripe of each of the plurality of superblocks includes an FSP from each of the blocks in the superblock.

Once each FSP for a given program is filled (i.e., once data for three or four pages of a given memory die of memory 140 have been accumulated and a program command has been generated based on the data), FTL 162 generates a description of the program required for programming to memory 140. The description generated by FTL 162 includes the physical address at which the program should be directed, the corresponding LBAs, and the write buffers of internal memory 170 being used to host the data from which the command was generated. FTL 162 passes this information to the FIL 164 of the controller 160, which may be responsible for ultimately queueing the commands to the dies of memory 140.

The description of the program generated by FTL 162 further contains a superblock identifier. FTL 162 assigns the superblock identifier to each command based on the stream identifier received with the write data sent by the host from which the command is generated. The superblock identifier assigned to each command by the FTL 162 indicates a target superblock of the plurality of superblocks. In certain embodiments, there is maintained a one-to-one correspondence between a host command stream and a superblock to which the commands in the stream are directed. FTL 162 maintains this correspondence by assigning the same super-block identifier to each command received from a same host stream (and thus having the same stream identifier). Commands having the same superblock identifier assigned by FTL 162 are grouped together for execution to the same superblock.

As discussed further below, FTL 162 also maintains, for each stripe of each of the plurality of superblocks, a register of the dies of each stripe of each of the plurality of superblocks that has been programmed.

FTL 162 is configured to send to flash-interface-layer (FIL) 164 the data from the program command generated from the FSPs, the physical address to which the commands will be directed, and the superblock identifier. The FTL 162 maintains an open superblock stripe for each stream that accumulates write data in internal memory 170. The FTL 162 will stripe the write data across the die comprising the stripe. Once sufficient write data has been accumulated to fill an FSP for a given die, a program command can be created and queued with the die by FIL 164. The FTL 162 then moves to start accumulating a FSP for a next die in the stripe.

Meanwhile, FIL 164 monitors the superblock identifier and the physical address sent by FTL 162 to determine the superblock and die to queue the received commands. FIL 164 also monitors the number of commands in each of the queues (i.e., FIL 164 monitors the queue depths) associated with the dies of the superblock corresponding to the identifier received with the command. Upon receipt of a program command (which includes a superblock identifier indicating a target superblock and a reference to a stripe of the superblock), FIL 164 further queries FTL 162 to determine, from the register maintained by FTL 162, which dies of each stripe of the superblock have already been programmed.

Based on this information, FIL 164 queues each command to one of a plurality of command queues 180. Each of command queues 180 may be configured to direct program commands only to a particular die of memory 140. For example, queue 182 may direct commands to a first memory die, queue 184 may direct commands to a second memory die, and so forth. Because each superblock has components from a plurality of dies, a particular superblock may be accessible by a plurality of command queues 180.

FIL 164 queues the command to one of the queues associated with the dies of the superblock in a manner so as to maintain the same number of commands (i.e., so as to maintain queue depth equality, or at least near equality) in each command queue 180. In order to ensure queue depth equality, FIL 164 may direct a command to a queue of command queues 180 corresponding to a die that is different from the die corresponding to the physical address sent in the command description by the FTL 162 to the FIL 164. In other words, the command may be queued to a die having a physical address different than that assigned to the command by FTL 162 in order to maintain equal queue depths. Once the commands are queued by FIL 164, NAND interface 134 directs the command to the appropriate NVM die of memory 140.

As discussed above, the presence of bad blocks may affect the amount of data accumulated in a given FSP. FIL 164 must also consider the presence of bad blocks in memory 140 when making decisions as to the die of memory 140 to which a given program command will be queued. The amount of write data accumulated for a given program command is determined by choice of physical address made by FTL 162 when data started to be accumulated for that program command. If the die blocks targeted by the program command contain a bad block, the final program data size will reflect this (i.e., as discussed above, the presence of a bad block may alter the amount of data that is accumulated for a given FSP). Similarly, when FIL 164 chooses to redirect a program command to a die having a physical address different than that corresponding to the one assigned by FTL 162 to maintain queue depth equality, it may be that the targeted die blocks contain a bad block. As a result, mismatch in size of data to be programmed and space on the die to accommodate the program may occur. The most straightforward solution is to avoid any redirections involving bad blocks by FIL 164.

To maintain relative equality among the number of commands in each queue 180 (also referred to as queue depths or queue fill levels), FIL 164 may queue a command to a die of the superblock having the smallest number of commands in its corresponding queue. By repeatedly queueing commands in this manner, the queue depths will eventually become equal. In some instances, the FIL 164 may maintain queue depth equality by queueing commands so that the number of commands in each queue lies within a given range. For example, if there are 100 commands received from a host to be divided among 10 queues, the FIL 164 may ensure that each of the 10 queues contains between 8 and 12 commands. Generally, the FIL 164 may queue commands so that the queue depth of each command lies between a lower threshold T1 and an upper threshold T2, $$T1 < Queue\ depth < T2.$$

In some instances, each of T1 and T2 may be defined in terms of a percentage of the total commands to be queued to a superblock. In certain instances, T1 and T2 may be within ±20% of an average queue depth. For example, T1 may be 80% of the total commands to be queued to a superblock and/or T2 may be 120% of the total commands to be queued to a superblock. In other instances, the FIL 164 may maintain equality of fill levels by ensuring that each queue contains a number of commands above some threshold. For example, if there are 100 commands received from a host to be divided among 10 queues, the FIL 164 may ensure that each of the 10 queues contains at least 8 commands. The FIL 164 may also queue commands so that the depth of each queue differs from the average queue depth by no more than a predetermined value, e.g., by one command. FIL 164 may also queue commands so that the each queue contains a number of commands that differs from the average number of commands across all queues by no more than one standard deviation in the number of commands. The FIL 164 may ensure that queue depths differ from the average by no more than one by queueing commands in any of the above described manners. By maintaining queue depth equality in these manners, which, as discussed, may involve directing the command to a die other than that indicated by the physical address included in the description of the program command generated by FTL 162, the FIL 164 ensures that the memory dies of the storage system are evenly used. In particular, by ensuring that the depths of each queue corresponding to a given superblock differ as little as possible from the average queue depth for the superblock, FIL 164 can prevent any queue to a die corresponding to a given superblock from being empty. Avoiding empty command queues prevents die starvation, which improves the SSD performance as a whole.

In certain instances, FIL 164 may determine that each queue corresponding to the dies of a given superblock contains the same number of commands and thus has an equal queue depth. In such instances, FIL 164 may queue a received command to a queue of command queues 180 corresponding to the die of the superblock having the physical address contained in the program description generated by FTL 162.

Regardless of the die to which the command is queued or the scheme by which FIL 164 selects a die to which a command will be queued, after the command is queued, FIL 164 instructs FTL 162 to update the fill/program status of that die in the maintained register. If FIL 164 directed a program command to a die different from that corresponding to the physical address received by FTL 162, then once it can be guaranteed that the program data in a given FSP will eventually reach a given memory die, FIL 164 also instructs FTL 162 to update the lookup table stored in local external memory 150, so as to maintain a current mapping between the physical addresses to which commands have been programmed and the corresponding LBAs of their respective write data. As such, an association between each LBA in the FSP and the stored location on NAND can be established. Once the lookup table stored in local external memory 150 is updated, the LBAs of all data encompassed by a program command refer to the physical locations on the memory at which that data will eventually reside. These physical locations are modified when FIL 164 decides to redirect a program command, and thus FIL 164 must modify metadata associated with the program command to reflect the new physical address such that the FTL 162 will perform the correct updates to the lookup table stored in local memory 150.

After programming one die in a stripe of a superblock with the commands generated from FSPs, the controller 160 programs the next die in the stripe of the superblock. This process repeats until every die in a stripe of a superblock has been programmed, at which point parity data is computed for the stripe. The parity data is programmed to the stripe, and programming begins on the next stripe or superblock in the manner described above. The choice of die to which the parity data is programmed may remain fixed per superblock, or may be allowed to vary within given data stripes in order to allow for additional flexibility in equalizing queue depths. Due to pipelining within SSD 120, there may be program commands queued with FIL 164 and awaiting placement on command queues 180 for a given stripe of the superblock while FTL 162 has already begun to form program commands for a next stripe of the superblock, and to queue those program commands for the next stripe to FIL 164.

Figure 2B:
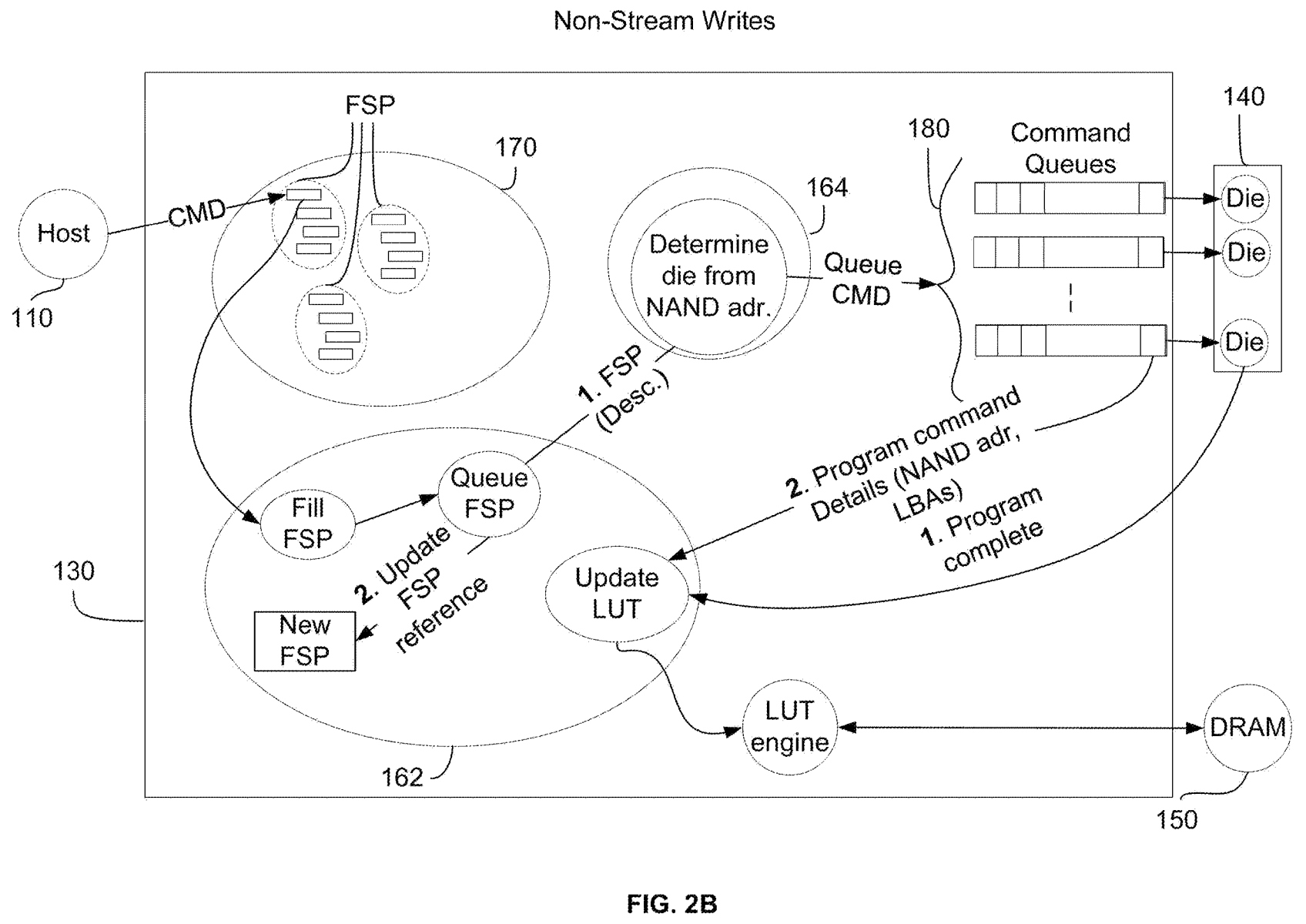

FIG. 2B demonstrates how an exemplary SSD, such as SSD 120 of FIG. 1, is configured to received write data from a single host write stream. In the discussion of FIG. 2B, all element numbers refer to like elements in FIG. 1 and FIG. 2A. While the boundaries of SSD 120 are not illustrated in FIG. 2B, a person of skill in the art would understand that the SOC boundary 130 illustrated in FIG. 2B corresponds to the boundary of SOC 130 in SSD 120 of FIG. 1.

FIG. 2B demonstrates that write data 111 from a write stream is received from host 110. Once within SoC 130, write data received from host 110 are accumulated in local internal memory 170, which may be a write buffer 170.

Write data may also be accumulated in local external memory 150. As discussed above, write data accumulated in internal memory 170 are used to fill out FSPs, and once all of the write data for a given program have been aggregated into FSPs, FTL 162 prepares to queue the FSPs.

FTL 162 generates a description ("Desc." In FIG. 2B) of the commands to be programmed to the dies of memory 140. The description generated by FTL 162 includes the physical address at which the program should be directed, the corresponding LBAs, and the write buffers of internal memory 170 being used to host the data. FTL 162 passes this information to the FIL 164 of the controller 160, which may be responsible for ultimately queuing the commands to the dies of memory 140. After passing this information to FIL 164, FTL 162 can proceed to generate descriptions of commands to be programmed to the next memory die in the stripe of the superblock corresponding to the write stream received from host 110 ("New FSP" in FIG. 2B). FTL can determine the appropriate size for an FSP to be generated based on the presence of any bad blocks, as discussed above.

In FIG. 2B, once a command and its corresponding description are received by FIL 164, FIL 164 looks to the NAND address of the description sent by FTL 162 and queues the command to the die in memory 140 corresponding to that NAND address. For every LBA in a given program, FTL 162 updates a lookup table (LUT) to reflect that the command has been programmed on the memory 140. The lookup table may be stored in local external memory 150, which as previously discussed, may be DRAM. After the LUT is updated, the internal memory 170 that was used to buffer the commands that have been programmed can be freed so as to accept new commands.

Figure 2C:
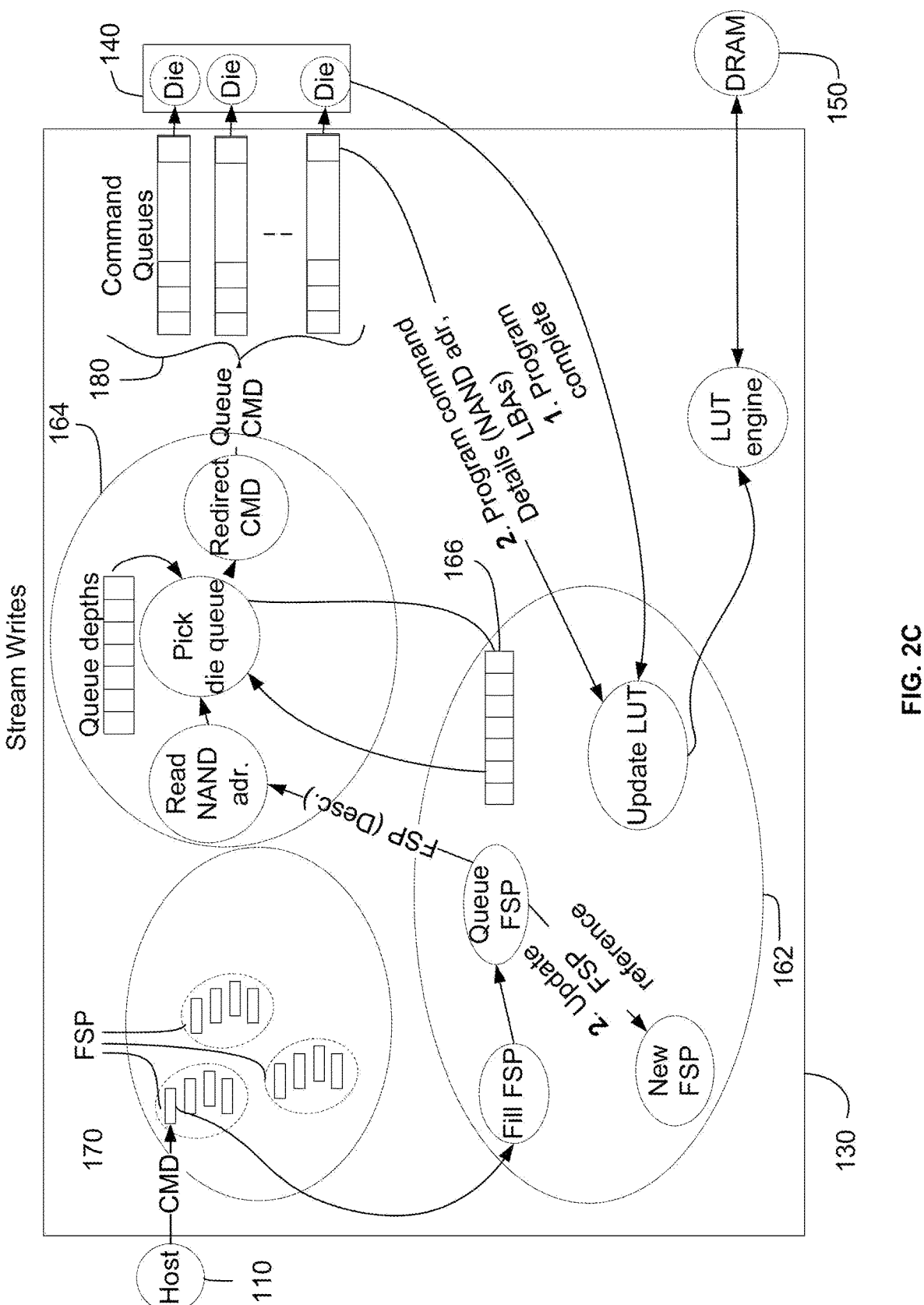
FIG. 2C illustrates an exemplary manner in which the SSD of FIG. 2A receives commands from multiple host write streams.

FIG. 2C demonstrates how an exemplary SSD, such as SSD 120 of FIG. 1, implements the present disclosure in receiving commands from multiple host write streams. In the discussion of FIG. 2C, all element numbers refer to like elements in FIG. 1 and FIG. 2A. FIG. 2C demonstrates that write data is received via multiple streams from host 110. As previously discussed, each such write command stream received from host 110 may correspond to a particular program running on the host. Further, the write data received from each such stream received from host 110 may be destined for a same superblock of the plurality of superblocks of memory 140. Once within SOC 130, write data received from host 110 are accumulated in local internal memory 170, which may be a write buffer 170. Write data may also be accumulated in local external memory 150. As discussed above, write data accumulated in internal memory 170 are used to fill out FSPs, and once all of the data for a given program have been aggregated into FSPs, FTL 162 prepares to queue the FSPs.

FTL 162 generates a description of the commands to be programmed to the dies of memory 140. The description generated by FTL 162 includes the physical address at which the program should be directed, the corresponding LBAs, and the write buffers of internal memory 170 being used to host the data. FTL 162 passes this information to the FIL 164 of the controller 160, which may be responsible for ultimately queuing the commands to the dies of memory 140. After passing this information to FIL 164, FTL 162 can proceed to generate descriptions of commands to be programmed to the next memory die in the stripe of the superblock corresponding to the write stream received from host 110.

Upon receipt of a command and a corresponding description from FTL 162, FIL 164 queues the command to a die of memory 140. FIL 164 determines the die to which FTL 162 intends the command to be programmed by observing the physical address sent in the description of each command. FIL 164 is configured to pick the optimal die queue within the current superblock and stripe by examining the fill levels of each of the queues directed to each of the dies of the current superblock in memory 140. FIL 164 is further configured to query FTL 162 regarding the die fill status of each die in the given stripe. To this end, FTL 162 maintains a die fill register 166, which tracks the fill status of each die in each stripe of each superblock of memory 140.

Based on these considerations, FIL 164 may revise the physical NAND address corresponding to a given command, routing it to a die of the given stripe and superblock so as to maintain equality among the queue depths of each of the queues for the dies in memory 140 of the given stripe and superblock. Based on the decision of FIL 164 to queue a command to a die having a physical address other than that sent with the description of the command by FTL 162 to FIL 164, FTL 162 updates die fill register 166 and a lookup table (LUT) to reflect the new mapping between the LBA originally associated with the write data within a command and the actual physical address in memory 140. The lookup table may be stored in local external memory 150, which as previously discussed, may be DRAM. After the LUT is updated, the internal memory 170 that was used to buffer the commands that have been programmed can be freed so as to accept new commands.

Figure 3:
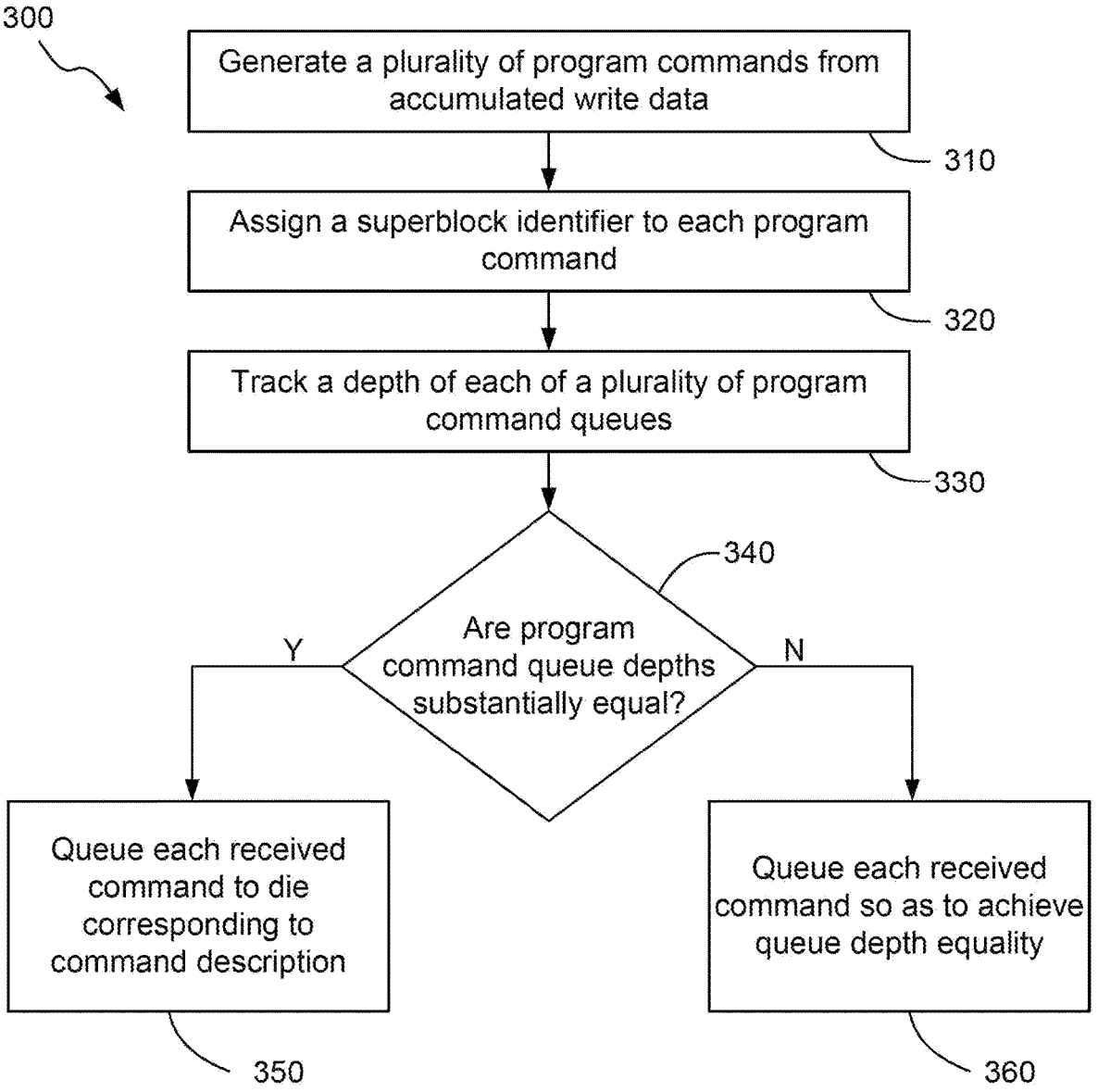
FIG. 3 illustrates an exemplary method by which a controller of the SSD of FIGS. 1 and 2 queues received commands so as to equalize queue depths, according to one or more embodiments of the present disclosure.

FIG. 3 demonstrates an exemplary method 300 performed by the controller of an SSD in accordance with the embodiments of the disclosure. The controller that performs the method 300 of FIG. 3 may be, in some embodiments, controller 160 of FIG. 1 or FIG. 2.

In step 310 of method 300, the controller generates a plurality of program commands from a plurality of accumulated write data. As discussed above with respect to FIG. 2, the plurality of write data may be accumulated in an internal write buffer of the SSD that is in communication with the controller. The write data accumulated in step 310 of method 300 may be sent to the internal write buffer via at least one of a plurality of write streams, each of the plurality of write streams having a corresponding stream identifier. In step 320 of method 300, the controller assigns to each accumulated command a superblock identifier. The superblock identifier assigned to each command may be based on the stream identifier corresponding to the write stream that sent the particular accumulated command. In some embodiments, there is maintained a one-to-one correspondence between write streams and corresponding superblocks. In such embodiments, all commands sent from a write stream having a common given stream identifier are grouped together by a controller, such as controller 160 of FIG. 1 or FIG. 2, for execution to the same superblock in the SSD.

In step 330 of method 300, the controller tracks a depth of each of a plurality of program command queues. Step 330 need not occur temporally after step 320 has occurred, and in fact, an operational controller performing method 300 may be continuously tracking the depth of each of a plurality of program command queues. As discussed above with respect to FIG. 2, in some embodiments, it is an FIL 164 of a controller, such as FIL 164 of FIG. 2, that tracks the depth of each of the plurality of command queues.

At decision point 340 of method 300, the controller determines if the program command queue depths for each of the dies in a given superblock are substantially equal. An FIL of the controller, such as FIL 164 of FIG. 2, may make this determination, and may do so based on the queue depths that it tracks as described with respect to step 330.

If the result of step 340 is Yes, i.e. "Y" at step 340, the controller queues the programs commands to the dies corresponding to a description of the command generated by the controller, as shown in step 350. As discussed above, the description of the command may be generated by an FTL of the controller, such as FTL 162 of FIG. 2, and may contain the physical address at which the program should be directed, the corresponding LBAs, the write buffers of internal memory 170 being used to host the data, and an identifier of a superblock. The FIL 164 of the controller may queue the commands to the corresponding dies based on the command descriptions received from the FTL, such as FTL 162 of FIG. 2.

If the result of step 340 is No, i.e. "N" at step 340, the controller queues the commands to memory dies such that the depths of the each of the queues for the dies in the superblock approaches or attains equality, as shown in step 360. In making this decision, the controller will consider which dies in the superblock have already been programmed. As discussed above, in some embodiments, an FIL of a controller, such as FIL 164 of FIG. 2, will query an FTL of the controller, such as FTL 162 of FIG. 2, to determine which dies of the superblock have already been programmed. The FTL 162 of the controller may be configured to maintain a die register containing information regarding which dies of each stripe of each superblock have been programmed. Again, the FIL 164 of the controller may be ultimately responsible for queuing the commands so as to approach or attain queue depth equality.

As discussed above with respect to FIG. 2, the controller (or the FIL thereof) may maintain substantially similar queue depths by queuing commands in any number of ways. In some implementations, the controller may queue commands to the die having a corresponding queue containing the smallest number of commands. By repeatedly queueing commands in this manner, FIL 164 may even out queue depths and improve SSD performance. In some instances, the FIL 164 may maintain the number of queues of each command queue so as to be within a given range. In certain implementations, the FIL 164 may queue commands so that each queue contains a given percentage of the total accumulated commands. In other instances, the FIL 164 may maintain the number of queues of each command queue so that each queue contains a number of commands above some threshold. The FIL 164 may also queue commands such that the number of commands in each queue differs by no more than some predetermined value. For example, the FIL 164 may queue commands such that the number of commands in each queue differs by no more than 1. FIL 164 may also queue commands so that the each queue contains a number of commands that differs from the average number of commands across all queues by no more than some predetermined value, or by no more than one standard deviation in the number of commands. By maintaining queue depth equality in these manners, which, as discussed, may involve directing the command to a die other than that indicated by the original physical address, the FIL 164 ensures that the memory dies of the storage system are evenly used. By ensuring that the depths of each queue corresponding to a given superblock differ as little as possible from the average queue depth for the superblock, FIL 164 can prevent any queue to a die corresponding to a given superblock from being empty. Avoiding empty command queues prevents die starvation, which improves the SSD performance as a whole.

FIGS. 4A-4F demonstrate how commands generated from write data received from multiple write streams are propagated through an SSD controller until they are ultimately queued to NAND dies for programming thereto. While FIGS. 4A-4F illustrate a case in which commands are received from only two separate write streams, a person of skill in the art would understand that the described embodiment could be used to queue commands received from any number of write streams. Similarly, while FIGS. 4A-4F illustrate a scenario in which commands are programmed across two superblocks across four dies, the embodiments herein could be used to queue commands to any number of superblocks containing any number of memory dies. Finally, while commands are shown as individual blocks, a person of skill in the art would understand that each illustrated command comprises sufficient data to fill an FSP and generate a program command based thereon, as described above.

Figure 4A:
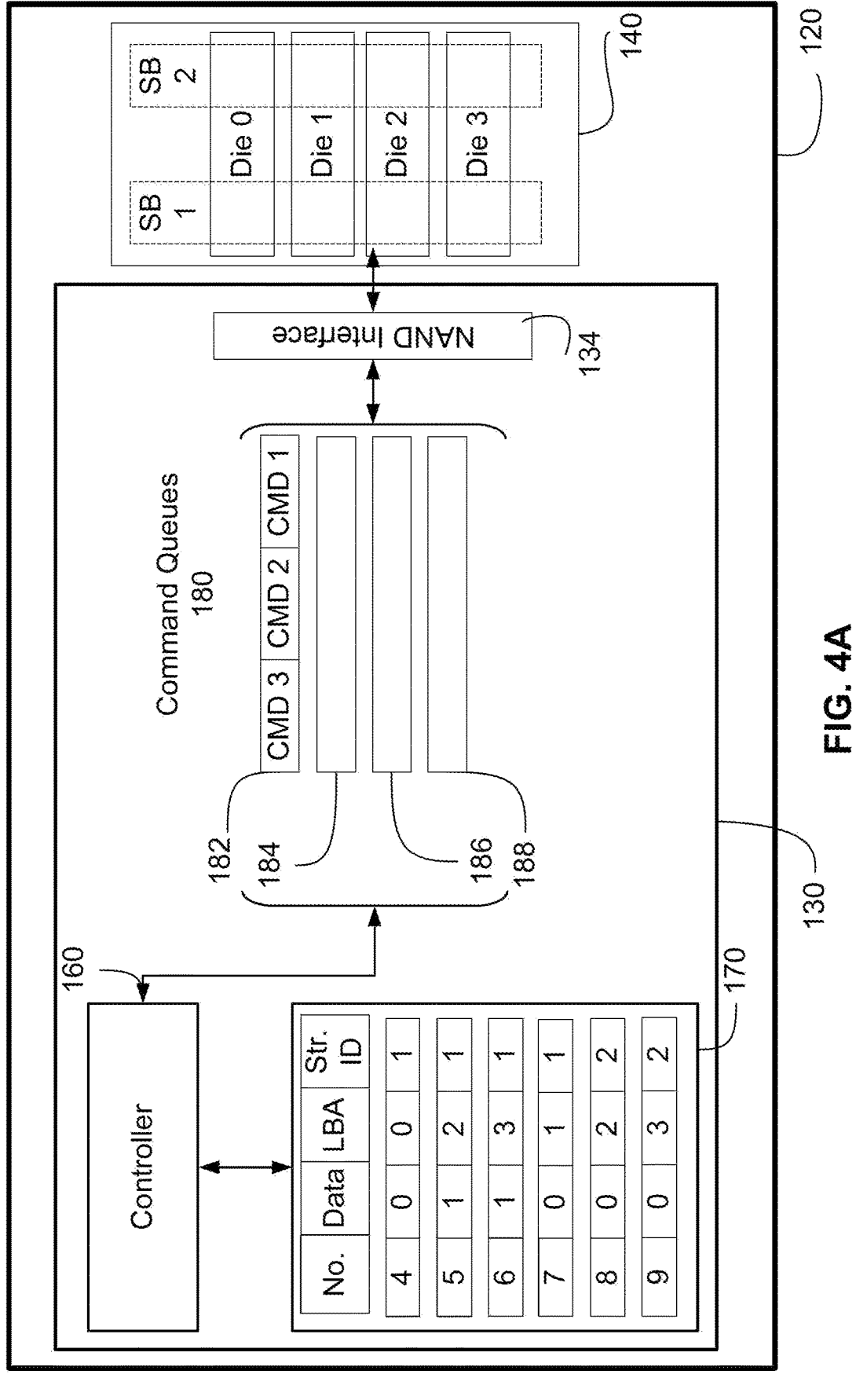
FIGS. 4A-4F illustrate the propagation of exemplary commands received from multiple write streams through the SSD controller and non-volatile memory die queues, according to one or more embodiments of the present disclosure.

FIG. 4A shows components of a storage system 120, including internal memory 170 and controller 160 (such as controller 160 of FIG. 1), which is in communication with a memory device 140 (such as memory device 140 of FIG. 1). Memory device 140 comprises memory dies 0, 1, 2, and 3. Each of memory dies 0, 1, 2, and 3 comprises blocks having LBAs that are divided, by a controller of the memory device, among superblock 1 and superblock 2. For example, controller 160 may be responsible for assigning the LBAs corresponding to blocks of memory dies 0, 1, 2, and 3 to superblocks 1 and 2. Each memory die has a corresponding command queue of command queues 180. Command queue 182 queues commands to die 0. Command queue 184 queues commands to die 1. Command queue 186 queues commands to die 2. Command queue 188 queues commands to die 3.

At the moment of time shown in FIG. 4A, die 0 has three commands (CMD1, CMD2, and CMD3) in its corresponding queue 182. Also in FIG. 4A, there are six commands—CMDs 4-9—generated from data accumulated in a write buffer 170, which may be, for example, local internal memory 170 of FIG. 1. Each command comprises data to be programmed, an LBA, and a stream identifier corresponding to the write stream from which the command originated. The write data from which the commands are generated are sent to the write buffer 170 by a host (not illustrated) via plurality of write streams, as previously discussed. In FIG. 4A, it is seen that the commands accumulated in the write buffer originated from two different write streams, having respective stream IDs '1' and '2'. Commands having data originating from stream 1 are destined for superblock 1. Commands having data originating from stream 2 are destined to superblock 2. Controller 160 is communicatively coupled to write buffer 170.

Figure 4B:
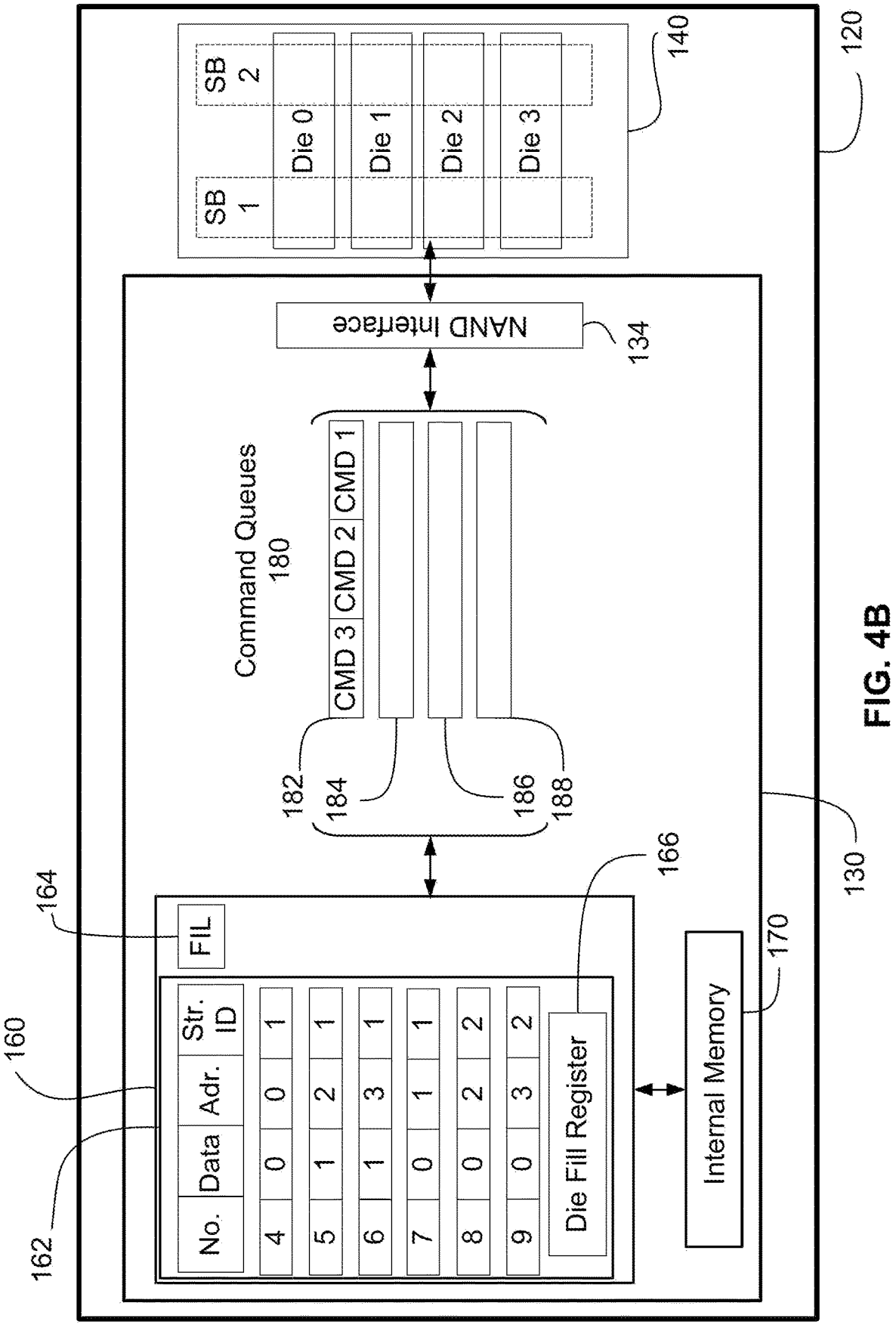

FIG. 4B shows the storage system 120 of FIG. 4A at a moment in time at which the controller 160 begins to queue the commands generated from the write data received by the host and accumulated in the internal memory 170. It is shown that the controller 160 houses FTL 162 and FIL 164. FTL 162 generates a description of the program required for programming to memory 140. The description generated by FTL 162 includes the physical address at which the program should be directed ("Adr."), the corresponding LBAs, and the write buffers of internal memory 170 being used to host the data from which the command was generated. Additionally, the FTL 162 assigns to each command a superblock identifier ("SB ID") based on the stream identifier sent with each command by the host to the write buffer 170. FTL 162 performs these functions for each command received from the host once the last command for a given program has been received in the buffer 170 (of FIG. 4A, not illustrated in FIG. 4B). After FTL 162 performs these functions, it send the commands (including the data, the physical addresses, and the superblock identifiers) to FIL 164 for queueing. It is also shown that FTL 162 maintains a die fill register 166 for each die in each stripe of each superblock. Die fill register 166 comprises an updatable register of the programming status of each die of memory 140 for every stripe in each superblock. As will be discussed later, FIL 164 queries FTL 162 for information from die fill register 166 in order to queue commands to equalize command queue depths.

Figure 4C:
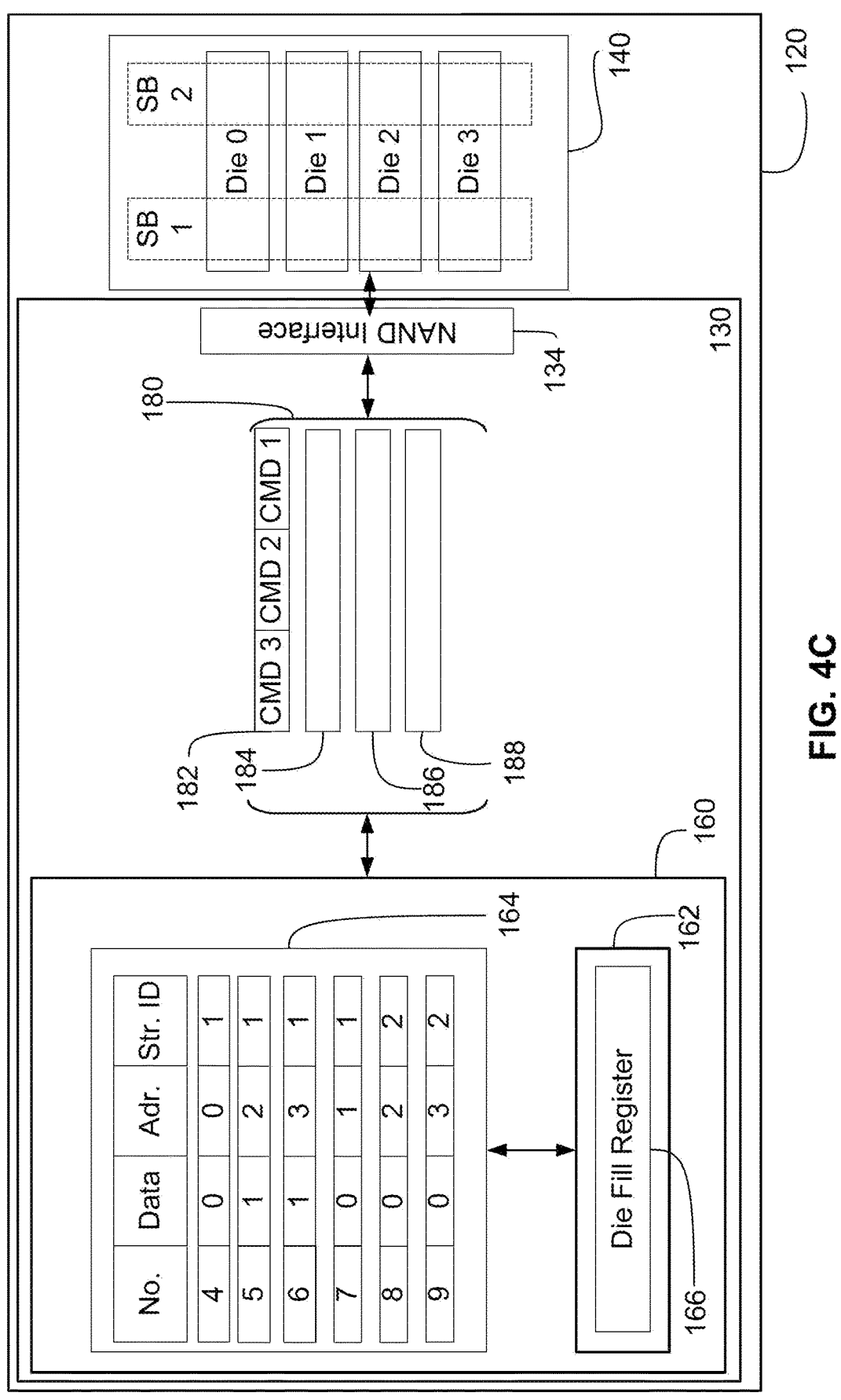

FIG. 4C shows that FTL 162, after having sent its commands to FIL 164, maintains its die fill register 166 and can continue to performs functions on commands that continue to be sent to the internal memory (not illustrated for the sake of clarity). Further, FIG. 4C shows FIL 164 after it has received commands for queuing from FTL 162. FIG. 4C also shows how FIL 164 queues commands to different dies of a superblock, and that FIL 164 communicates with the NAND interface 134 to ultimately program the commands to the appropriate dies.

As discussed above with respect to FIG. 3, an operational FIL such as FIL 164 is continuously tracking the queue depths for each command queue. At the moment illustrated in FIG. 4C, FIL 164 notes that queue 182, which may be, for example, queue 182 of FIG. 2, has three commands therein. FIL 164 notes that queues 184, 186, and 188 are empty. Further, FIL 164 communicates with FTL 162 to determine, from the die register maintained by FTL 162, which dies of superblocks 1 and 2 are programmed for a given stripe. In the exemplary case of FIG. 4C, FTL 162 alerts FIL 164 that dies 1, 2, and 3 of superblock 1 have yet to be programmed. With this information, FIL 164 proceeds to queue CMDS 4-9.

Figure 4D:
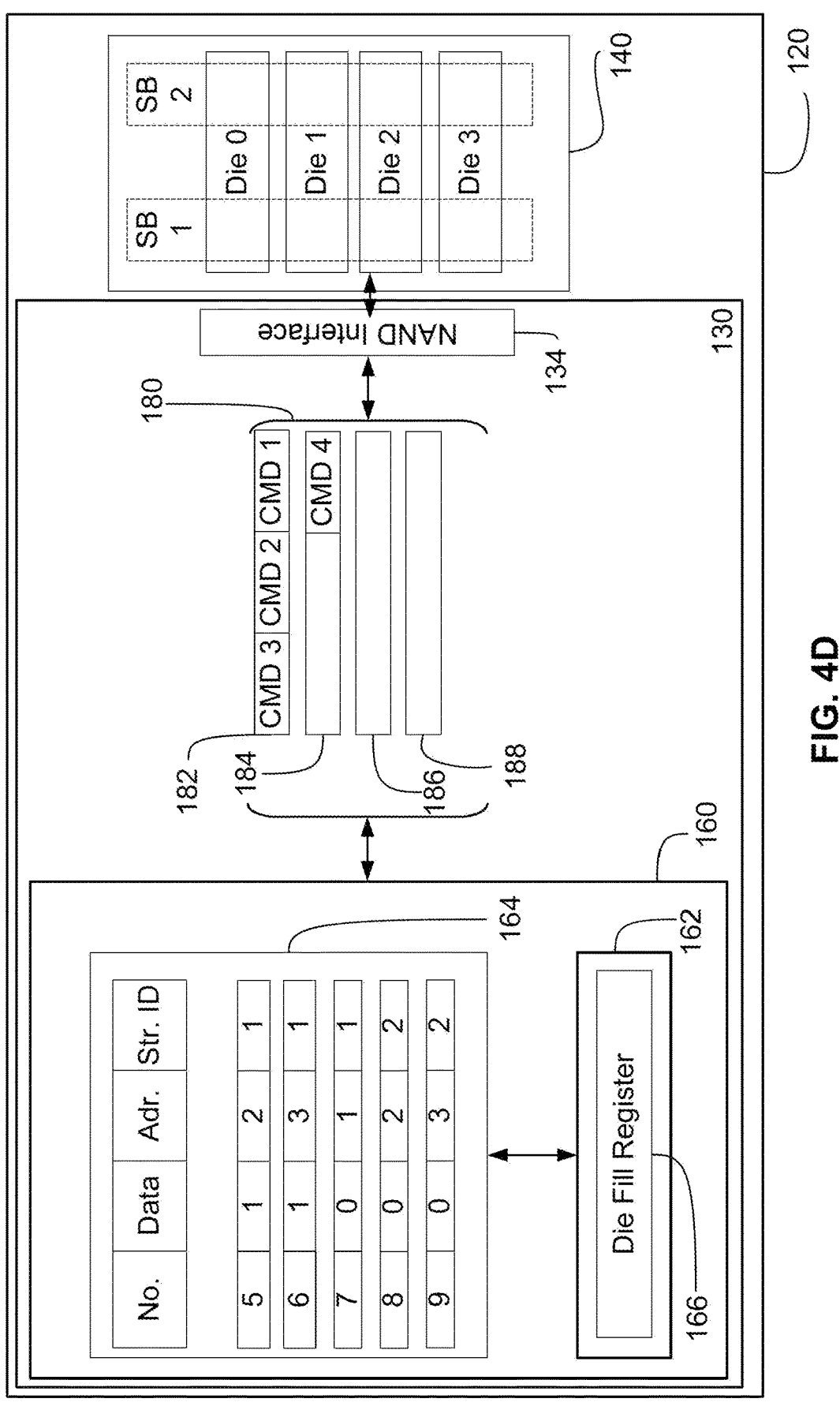

As shown in FIG. 4D, FIL 164 first queues CMD 4. FIL 164 notes, however, that CMD 4 is directed to physical address 0, i.e., to die 0. Because die 0 has three queued commands, FIL 164 instead queues CMD 4 to die 1. This brings the depths of command queues 180 closer to equality. FIL 164 alerts FTL 162 to its decision to direct the command to a die other than that which was originally intended so that FTL 162 may update its die fill register 166 accordingly. As described above, FTL 162 must also update a lookup table (stored in a local external memory, such as local external memory 150 of FIG. 1; not illustrated) based on the choice of FIL 164 to redirect the command.

Figure 4E:
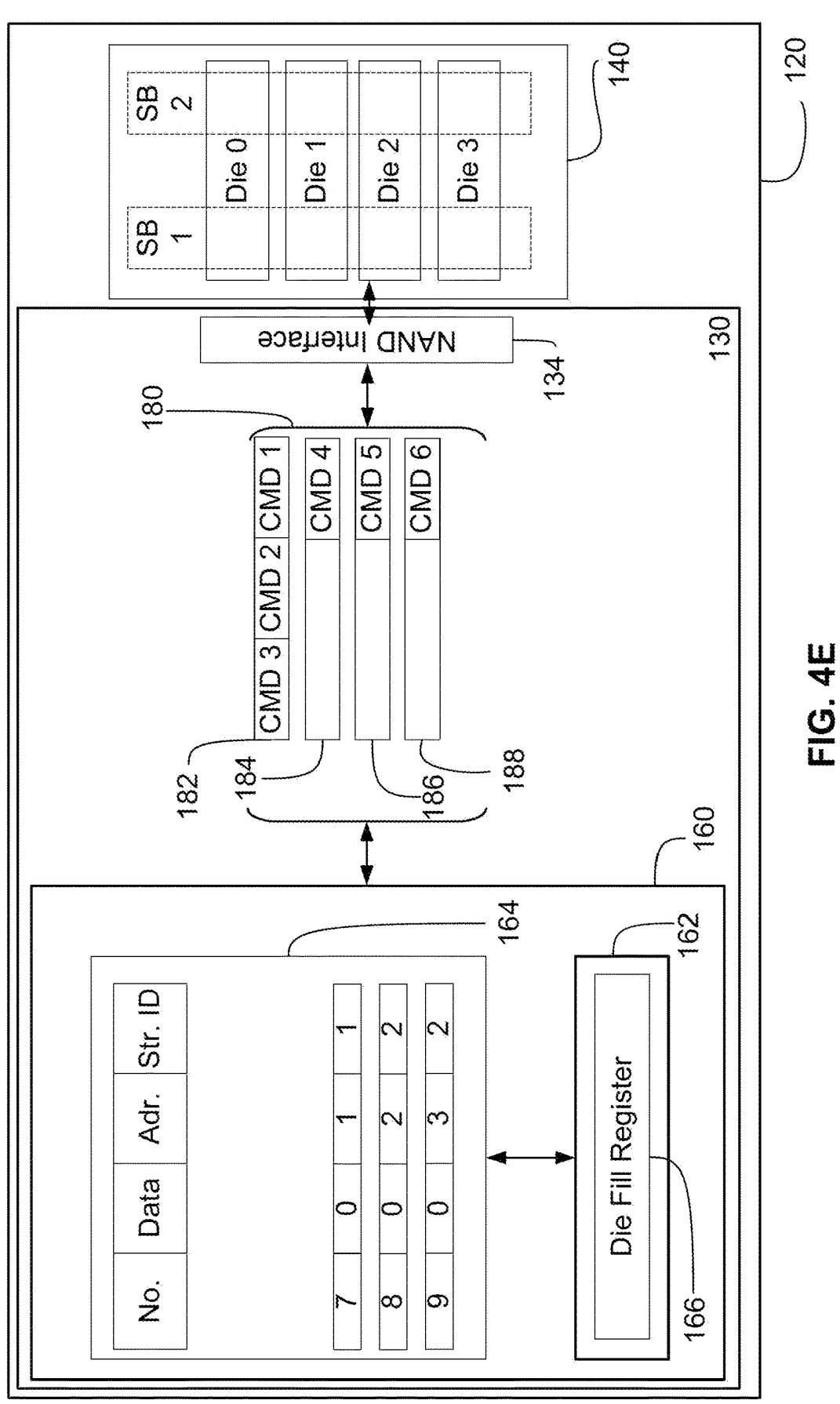

In FIG. 4E, FIL 164 queues CMD 5 and CMD 6 to, respectively, die 2 and die 3. These dies correspond to the physical addresses received with the description of each command that is generated by FTL 162. FIL 164 again instructs FTL 162 to update its fill register to reflect the placement of these commands.

Figure 4F:
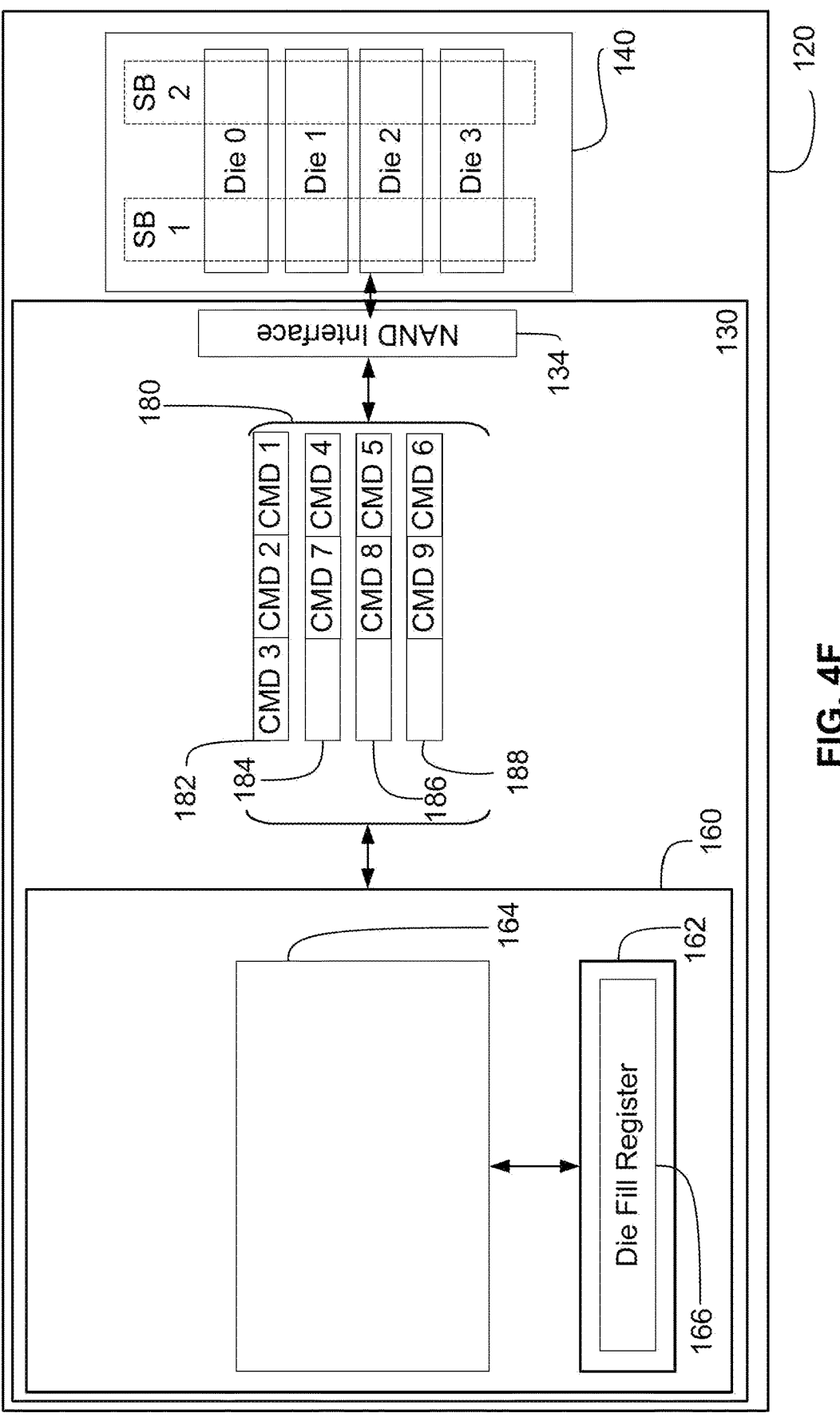

Finally, in FIG. 4F, FIL 164 queues CMD 7, CMD 8, and CMD 9 to the queues corresponding to dies 1, 2, and 3, respectively. Despite CMD 8 and CMD 9 originating from a different stream, and thus being directed to a different superblock than are commands 1-6, FIL 164 queues all of the commands to their respective memory dies together, regardless of their intended superblock. By queueing commands in the manner described in FIGS. 4A-4F, the system equalizes the queue depths of the memory dies of memory 140. As discussed above, the system may queue commands to achieve queue depth equality in accordance with any number of schemes. By queueing commands so as to equalize queue depths, die starvation is avoided.

In particular, FIL 164 may queue a command to a die of the superblock having the smallest number of commands in its corresponding command queue of command queues 180. By repeatedly queueing commands in this manner, the queue depths will eventually become equal. In some instances, the FIL 164 may maintain queue depth equality by queueing commands so that the number of commands in each queue lies within a given range. For example, if there are 100 commands received from a host to be divided among 10 queues, the FIL 164 may ensure that each of the 10 queues contains between 8 and 12 commands. Generally, the FIL 164 may queue commands so that the queue depth of each command lies between a lower threshold T1 and an upper threshold T2, T1<Queue depth<T2.

In some instances, each of T1 and T2 may be defined in terms of a percentage of the total commands to be queued to a superblock. In certain instances, T1 and T2 may be within ±20% of an average queue depth. For example, T1 may be 80% of the total commands to be queued to a superblock and/or T2 may be 120% of the total commands to be queued to a superblock. In other instances, the FIL 164 may maintain equality of fill levels by ensuring that each queue contains a number of commands above some threshold. For example, if there are 100 commands received from a host to be divided among 10 queues, the FIL 164 may ensure that each of the 10 queues contains at least 8 commands. The FIL 164 may also queue commands so that the depth of each queue differs from the average queue depth by no more than a predetermined value, e.g., by one command. FIL 164 may also queue commands so that the each queue contains a number of commands that differs from the average number of commands across all queues by no more than one standard deviation in the number of commands. The FIL 164 may ensure that queue depths differ from the average by no more than one by queueing commands in any of the above described manners. By maintaining queue depth equality in these manners, which, as discussed, may involve directing the command to a die other than that indicated by the original physical address, the FIL 164 ensures that the memory dies of the storage system are evenly used. By ensuring that the depths of each queue corresponding to a given superblock differ as little as possible from the average queue depth for the superblock, FIL 164 can prevent any queue to a die corresponding to a given superblock from being empty. Avoiding empty command queues prevents die starvation, which improves the SSD performance as a whole.

Figures 5A, 5B, 5C, 5D:
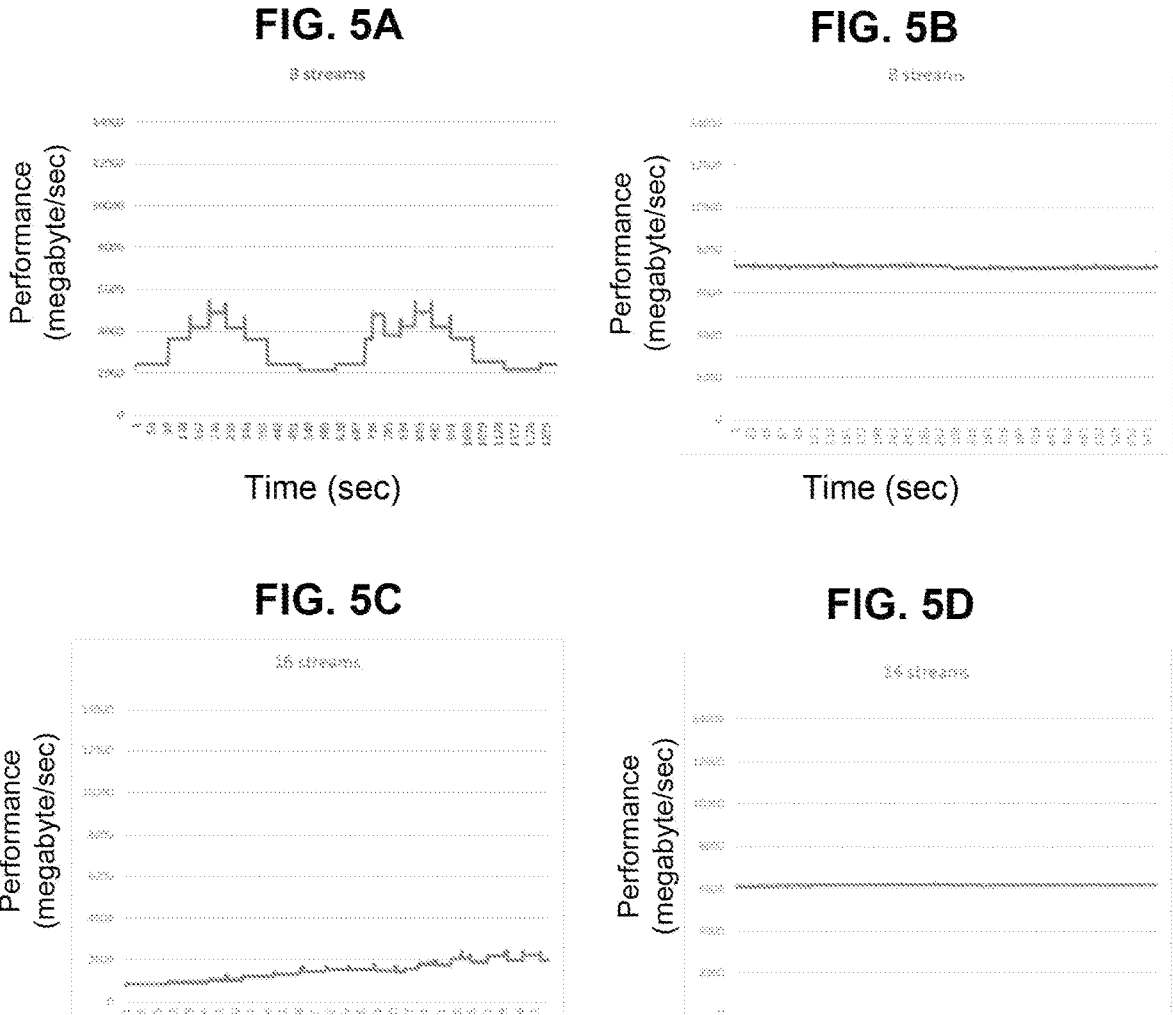
FIGS. 5A-5D provide exemplary performance data of the SSD after implementation of the systems and methods described by FIGS. 2-4, according to one or more embodiments of the present disclosure.

FIG. 5A shows the performance over time of an SSD receiving commands from eight write streams absent any queue depth equalization. Performance of the SSD in FIG. 5A is seen to vary significantly over time. FIG. 5B shows the impact of queue depth equalization on the performance of the same SSD. Aggregate performance of the SSD receiving commands from eight write streams is seen to improve once queue depths are equalized. Queue depths may be equalized in any of the manners described above. FIG. 5C shows the performance over time of an SSD receiving commands from sixteen write streams absent any queue depth equalization. Performance of the SSD of FIG. 5C is worse than that of FIG. 5A, as additional write streams leads to more collisions, as described above. FIG. 5D shows the improvement in aggregate performance of the SSD of FIG. 5C once queue depth equalization is implemented.

In the foregoing, each recitation of "layer" should be taken to mean a plurality of circuits within the controller that facilitates the function as described. Such circuits may comprise electronic components formed on a semiconductor chip, such as, for example, transistors and resistors. It should be noted that the term "about," "approximately," or "substantially" in the foregoing indicates a range of ±20% of the stated value. Additionally, in the foregoing, all recitation of "command," "action" or "function" should be taken to be based on algorithms and instructions stored on a non-transitory computer-readable medium, that, when executed by a processor, causes a controller of an integrated circuit of a solid-stated drive (SSD) to perform the command, action or function. All recitation of "device," "memory," and "dies" are used interchangeably when used in relation to the NAND non-volatile semiconductor memory device. The term "similar" as used herein indicates close to identical but for a stated difference.

Other objects, advantages and embodiments of the various aspects of the present invention will be apparent to those who are skilled in the field of the invention and are within the scope of the description and the accompanying drawings. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A method performed by a controller of a solid-state drive (SSD), the controller communicatively coupled to each of a plurality of non-volatile memory (NVM) dies and configured to logically assign blocks from the plurality of NVM dies to a plurality of superblocks, the method comprising:

generating, from a plurality of accumulated write data, a plurality of commands;

assigning, to each of the plurality of generated commands, an identifier corresponding to a superblock of the plurality of superblocks associated with the command;

tracking a number of commands in each of a plurality of command queues respectively corresponding to the plurality of NVM dies; and queuing at least one of the plurality of generated commands to a command queue of an NVM die of the superblock such that the number of commands for each of the plurality of NVM dies is substantially equalized.

2. The method of claim 1, further comprising, when each of the plurality of command queues corresponding to the respective superblock contains the same number of commands:

queueing the at least one of the plurality of generated commands to a die of the superblock corresponding to a description of the at least one of the plurality of generated commands generated by the controller.

3. The method of claim 1, further comprising:

maintaining a register of the dies of each of the plurality of superblocks that have been programmed.

4. The method of claim 3, further comprising:

updating the register based on the die to which each of the plurality of received commands is queued.

5. The method of claim 1, wherein the plurality of accumulated write data are received from a write stream of a plurality of write streams, each of the plurality of write streams corresponding to a respective program and to a respective superblock of the plurality of superblocks.

6. The method of claim 5 wherein each of the plurality of generated commands associated with a respective write stream of the plurality of write streams is queued once all of the commands for the respective write stream have been generated.

7. The method of claim 5, wherein the superblock identifier corresponds to a stream identifier associated with each of the plurality of write data received from the write stream.

8. The method of claim 4, wherein the steps of generating, assigning, maintaining, and updating are performed by a flash-translation-layer (FTL) of the controller.

9. The method of claim 8, wherein the step of tracking is performed by a flash-interface-layer (FIL) of the controller.

10. The method of claim 9, further comprising:

querying, by the FIL, the FTL to determine the NVM dies corresponding to the superblock that have yet to be programmed, and queuing, based on a result of the querying, the at least one of the plurality of generated commands to the die of the superblock.

11. A solid-state drive (SSD) comprising:

a plurality of non-volatile memory (NVM) dies;

a controller communicatively coupled to each of the plurality of non-volatile memory (NVM) dies and configured to:

logically assign blocks of the plurality of NVM dies to a plurality of superblocks;

generate, from a plurality of accumulated write data, a plurality of commands;

assign, to each of the plurality of generated commands, an identifier corresponding to a superblock of the plurality of superblocks associated with the command;

track a number of commands in each of a plurality of command queues respectively corresponding to the plurality of NVM dies; and queue at least one of the plurality of generated commands to a command queue of an NVM die of the superblock such that the number of commands for each of the plurality of NVM dies is substantially equalized.

12. The SSD of claim 11, wherein the controller is further configured to, when each of the plurality of command queues corresponding to the respective superblock contains the same number of commands:

queue the at least one of the plurality of received commands to a die of the superblock corresponding to a description of the at least one of the plurality of generated commands generated by the controller.

13. The SSD of claim 11, wherein the controller is further configured to:

maintain a register of the dies of each of the plurality of superblocks that have been programmed.

14. The SSD of claim 13, wherein the controller is further configured to:

update the register for the superblock based on the die to which each of the plurality of generated commands is queued.

15. The SSD of claim 11, wherein the controller is further configured to:

receive the plurality of accumulated write data from at least one of a plurality of write streams, each of the plurality of write streams corresponding to a respective program.

16. The SSD of claim 15, wherein the superblock identifier corresponds to a stream identifier associated with each of the plurality of write data received from the write stream.

17. The SSD of claim 14, wherein the controller is configured to generate, assign, maintain, and update by a flash-translation-layer (FTL) of the controller.

18. The SSD of claim 17, wherein the controller is configured to track the number of commands in each of the plurality of command queues corresponding to the dies of the superblock by a flash-interface-layer (FIL) of the controller.

19. The SSD of claim 18, wherein the FIL is configured to:

query the FTL to determine the NVM dies corresponding to the superblock that have yet to be programmed, and queue, based on a result of the querying, the at least one of the plurality of generated commands to the die of the superblock.

20. The method of claim 1, further comprising:

identifying a destination die for each of the plurality of generated commands, wherein queuing the at least one generated command to the die of the superblock having the corresponding command queue containing the smallest number of commands is performed instead of queuing the at least one generated command to the identified destination die for the identified at least one generated command.

* * * * *